United States Patent [19]

Baekelmans et al.

[11] 4,210,736

[45] Jul. 1, 1980

[54] PARTICLES OF TITANIUM TRICHLORIDES WHICH CAN BE USED FOR THE STEREOSPECIFIC POLYMERIZATION OF ALPHA-OLEFINES

[75] Inventors: Paul Baekelmans, Brussels; Albert Bernard, Kraainem, both of Belgium

[73] Assignee: Solvay & Cie., Brussels, Belgium

[21] Appl. No.: 32,478

[22] Filed: Apr. 23, 1979

Related U.S. Application Data

[63] Continuation of Ser. No. 730,845, Oct. 8, 1976, abandoned.

[30] Foreign Application Priority Data

Oct. 15, 1975 [LU] Luxembourg .............................. 73593

[51] Int. Cl.$^2$ .......................... B01J 31/38; C08F 4/64; C01G 23/02
[52] U.S. Cl. ................................ 526/142; 252/429 A; 423/492; 525/323; 526/159; 526/351; 526/907
[58] Field of Search ................... 252/429 A; 423/492; 526/142, 159, 907

[56] References Cited

U.S. PATENT DOCUMENTS

| | | | |
|---|---|---|---|
| 3,146,224 | 8/1964 | Coover et al. | 526/907 |
| 3,769,233 | 10/1973 | Hermans et al. | 526/159 |
| 3,926,848 | 12/1975 | Wristers et al. | 423/492 |
| 3,960,765 | 6/1976 | Shiga et al. | 526/142 |

FOREIGN PATENT DOCUMENTS 1391067  4/1975  United Kingdom ..................... 526/907

*Primary Examiner*—Stanford M. Levin
*Attorney, Agent, or Firm*—Spencer & Kaye

[57] ABSTRACT

Particles of titanium trichlorides usable for the stereospecific polymerization of alpha-olefines, especially propylene, having been dried until their liquid content is less than 1% by weight relative to the weight of titanium trichloride present in said particles, as well as a process for the preparation of such particles and a process for stereospecific polymerization in the presence thereof.

44 Claims, No Drawings

PARTICLES OF TITANIUM TRICHLORIDES WHICH CAN BE USED FOR THE STEREOSPECIFIC POLYMERIZATION OF ALPHA-OLEFINES

CROSS REFERENCE TO RELATED APPLICATION

This application is a continuation of Applicants' co-pending U.S. application Ser. No. 730,845 filed Oct. 8, 1976, now abandoned.

The present invention relates to particles of titanium trichlorides which can be used for the stereospecific polymerization of alpha-olefines, a process for preparing these particles, and a process for the polymerization of alpha-olefines by means of these particles.

It is known to polymerize alpha-olefines such as propylene stereospecifically by means of a catalyst system comprising a titanium trichloride in the form of solid particles and an activator consisting of an organo-metallic compound such as diethyl-aluminum chloride.

In Belgian Pat. No. 780,758 filed on Mar. 16, 1972, in the name of Solvay & Cie., there is described particles of titanium trichlorides which it is particularly advantageous to use in the polymerization of alpha-olefines. These particles are characterized by their particular structure. In effect, they consist of an agglomerate of microparticles which are themselves extremely porous. As a result, these particles exhibit a particularly large specific surface area and particularly high porosity.

This particular structure leads to exceptional performance in polymerization. Because of the porosity of the particles, the catalytic activity is so high that the polymerization can be carried out under conditions such that the catalyst residues are so slight that they no longer have to be removed. It is thus possible to manage without the conventional treatment of the resulting polymers with alcohol. Furthermore, since these particles have the shape of large regular spheres, the polymer obtained is also in the form of regular spherical particles. Consequently, it has a high apparent specific gravity and possesses very good pourability.

Finally, when these particles are prepared in accordance with the particular method of working also described in the above-mentioned Belgian Patent of Solvay & Cie., the polymers obtained exhibit very good stereoregularity and only contain a very small proportion of amorphous polymer. For the very great majority of applications, they can be used as they are, without conventional removal of the amorphous fraction by washing by means of a hot solvent.

However, the particles of titanium trichlorides prepared in accordance with the method of working described in the above-mentioned Belgian Patent suffer from a serious disadvantage. In effect, it has been found that if they are used for the polymerization of propylene at a relatively high temperature (of the order of 70° C.), the polymer obtained is no longer an enlarged replica of the starting particles and is in a degraded form from the point of view of the morphology; there are numerous fine particles, the shape of the particles is irregular and the apparent specific gravity is low. However, it is very advantageous to carry out the polymerization at a relatively high temperature in order to optimise the productivity of the polymerization installations.

There has now been found in accordance with the present invention particles of titanium trichlorides which have all the advantages of the particles prepared in accordance with the above-mentioned Belgian Patent and which furthermore no longer suffer from the disadvantage of giving a polymer of mediocre morphology if the polymerization temperature is relatively high.

The present invention accordingly relates to particles of titanium trichlorides which can be used for the stereospecific polymerization of alpha-olefines and which have been dried until their liquid content is less than 1% by weight relative to the weight of titanium trichloride present in the particles.

It has in effect found that when the particles are dried until the liquid content is less than the limit specified above, a hardening or tempering phenomenon takes place. If the drying is carried out under conditions which do not give such low contents of liquid, the disadvantages mentioned above is observed during polymerisation at a relatively high temperature. On the other hand, if drying is carried out so as to give the content of liquid mentioned above, the dried particles exhibit the same catalytic activity as, or even a slightly higher activity than, that of the particles which have a higher liquid content, and give polymers of excellent morphology even if the polymerization is carried out at a relatively high temperature.

Preferably, the particles are dried until their liquid content is less than 0.5%. The best results are obtained when the liquid content of the dried particles is less than 0.3%. It is generally of no interest to continue the drying until the liquid content of the particles reaches 0.01% because no further significant improvement in their properties is observed.

The particles of titanium trichlorides according to the invention can, before drying, be associated with any compound, or mixture of compounds, which is liquid under normal temperature and pressure conditions. This compound can be, for example, titanium tetrachloride, which has been used for the preparation of the trichloride, or can be a Lewis acid or Lewis base used to treat the trichloride. However, it is preferred that the liquid associated with the particles of titanium trichlorides subjected to drying be chosen from amongst aliphatic, cycloaliphatic and aromatic hydrocarbons and their mixtures which are liquid under normal temperature and pressure conditions. The best results are obtained with aliphatic and cycloaliphatic hydrocarbons containing from 3 to 12 carbon atoms, technical-grade hexane being used most commonly. Other examples of preferred hydrocarbons are pentane, heptane, octane, cyclohexane, benzene, toluene and the xylenes.

The particles of titanium trichlorides subjected to drying are generally associated with at least 1% of liquid, calculated as weight of liquid relative to the weight of titanium trichloride ($TiCl_3$) present in the particles. Preferably, the amount of liquid is at least 2%. The best results are obtained if it is at least 5%.

The working conditions under which the drying of the particles of titanium trichlorides is carried out are specified below. It has been found that the choice of these working conditions can contribute to boosting the hardening phenomenon mentioned above and can thus impart a yet further improved morphology to the polymer.

The drying temperature is generally below 90° C. In fact, drying operations carried out at a temperature above 90° C. give particles having a lower polymerization activity than that observed with particles dried at lower temperatures. On the other hand, drying temperatures below 20° C. are hardly practical because they excessively extend the drying time.

Preferably, the particles are dried at a temperature of between 50° and 80° C. The best results are obtained if the temperature is between 60° and 75° C.

The drying time depends not only on the temperature but also on numerous other working conditions. In every case, drying is continued until the liquid content of the particles is less than the limit mentioned above. The liquid content of the particles can be determined by difference, by heating a sample of the particles at a high temperature, for example, until their weight remains constant. In general, the drying time is between 15 minutes and 48 hours and preferably between 30 minutes and 6 hours. If all other conditions remain identical, the drying time is generally the shorter, the higher is the temperature.

The pressure under which the particles are maintained during drying is not critical provided it is less than the saturation pressure of the liquid associated with the particles. In general, the drying is carried out at atmospheric pressure or under reduced pressure. It can be advantageous to work under reduced pressure (of the order of a fraction of a mm of mercury), if the drying temperature is low, for example near ambient temperature, in order to accelerate the elimination of the excess liquid.

The drying of the particles can be carried out under a stream of an inert gas. For this purpose, nitrogen is preferably chosen. This inert gas must be purified to remove any substance which could inhibit the catalytic properties of the titanium trichloride, such as carbon monoxide and oxygen. The inert gas can be heated so as to provide all or part of the heat required for drying.

The drying of the particles of titanium trichlorides according to the invention can be carried out in any apparatus which is suitable for this operation, and, for example, in moving bed driers such as plate driers, rotating drum driers, pneumatic driers, tunnel-type driers and the like. It is also possible to use fixed-bed driers through which an inert gas flows. However, it is preferred to carry out the drying in a fluidized bed. In that case, the fluidization gas is an inert gas such as is defined above. Finally, the drying can be carried out continuously or discontinuously.

The particles subjected to drying can be employed in the form of a more or less concentrated suspension in the liquid with which they are associated. In this case, at the start of the drying operation, the liquid which forms the liquid phase of the suspension is first evaporated, before the actual drying commences. Thus, it is possible to inject the particles, in suspension in a liquid hydrocarbon, into a fluidized bed.

However, for economic reasons, it is preferred that the particles should not be associated with too large an amount of liquid, the evaporation of which would require too much heat. Preferably, the amount of liquid associated with the particles does not exceed the amount which the particles are capable of absorbing whilst remaining pulverulent and without forming a continuous liquid phase. If the particles are present in the form of a suspension it is thus advantageously possible, before drying, to remove the excess liquid phase, for example by filtration, centrifuging or syphoning.

The particles of titanium trichlorides used as starting products for preparing the dried particles according to the present invention can be obtained by any process. Thus they can be prepared from a solid complex based on titanium dichloride by oxidation-reduction, using titanium tetrachloride; these complexes based on dichloride are prepared by reducing the tetrachloride by means of aluminum in a benzene medium.

However, it is preferred to employ particles obtained by reduction of titanium tetrachloride. This reduction can be carried out by means of hydrogen or of metals such as magnesium and preferably aluminum. The best results are obtained starting from particles formed by reducing titanium tetrachloride with an organo-metallic compound. The latter can be, for example, an organo-magnesium compound. However, the best results are obtained with organo-aluminum compounds.

The organo-aluminum compounds which can be used preferentially are those which contain at least one hydrocarbon radical fixed directly to the aluminum atom. Examples of compounds of this type are the mono-, di- and tri-alkyl-aluminums wherein the alkyl radicals contain from 1 to 12, and preferably from 1 to 6, carbon atoms, such as triethyl-aluminum, the isoprenyl-aluminums, diisobutyl-aluminum hydride and ethoxydiethyl-aluminum. With the compounds of this type, the best results are obtained with the dialkyl-aluminum chlorides and in particular with diethyl-aluminum chloride.

The reduction of the titanium tetrachloride by means of an organo-aluminum compound can advantageously be carried out under the working conditions described in Belgian Pat. No. 780,758. Usually, the method of preparation requires the use, especially for washing operations, of an organic diluent of the same type as the liquids which are preferred for association with the particles of titanium trichlorides subjected to drying, in accordance with the present invention, which have been defined above. The particles obtained thus contain the same liquid after they have been prepared.

Particles of titanium trichlorides which are particularly suitable for drying in accordance with the present invention are those which are described in Belgian Pat. No. 780,758. These particles, which are spherical, generally have a diameter of between 5 and 100 microns and most frequently between 15 and 50 microns. They consist of an agglomerate of microparticles, which are also spherical, and which have a diameter of between 0.05 and 1 micron and most frequently between 0.1 and 0.3 micron. As has been stated, these particles possess a particular morphology in the sense that the micro-particles are extremely porous. As a result, the particles have a specific surface area, measured by the BET method based on nitrogen adsorption, which is greater than 75 m$^2$/g and is most frequently between 100 and 250 m$^2$/g. At the same time, the particles have an internal pore volume greater than 0.15 cm$^3$/g and, in the majority of cases, between 0.20 and 0.35 cm$^3$/g. The internal porosity of the particles can be measured by combining the nitrogen adsorption method with the mercury penetration method. The porosity of the micro-particles is witnessed by the high value of the pore volume measured on the particles and corresponding to pores of less than 200 Å in diameter. This pore volume is greater than 0.11 cm$^3$/g and in the majority of cases is between 0.19 and 0.31 cm$^3$/g. The apparent specific gravity (measured by tamping) of these particles is usually between 0.6 and 1.2 kg/dm$^3$.

In Belgian Pat. No. 780,758 there is also described a particular method of preparation of the particles defined in the preceding paragraph. This method comprises the reduction of the titanium tetrachloride by means of a reducing agent, which is preferably a dialkylaluminum chloride of which the alkyl chains comprise from 2 to 6 carbon atoms, under mild conditions. Thereafter a treatment with a complexing agent is carried out, the complexing agent preferably being chosen from amongst organic compounds which comprise one or more atoms or groups possessing one or more lone electron pairs capable of providing a coordination bond with the atoms of titanium or of aluminum present in the titanium or aluminum halides. The preferred complexing agents are aliphatic ethers wherein the aliphatic radicals comprise from 4 to 6 carbon atoms. Finally, a treatment with titanium tetrachloride is carried out and the particles are washed with diluents such as those defined above.

The particles prepared in accordance with this method of working, choosing the preferred conditions, correspond to the formula $TiCl_3 \cdot (AlRCl_2)_x \cdot C_y$, where R is an alkyl radical comprising from 2 to 6 carbon atoms, C is a complexing agent as defined above, x is any number less than 0.20 and y is any number greater than 0.009 and generally less than 0.20.

In a variant of the method of working described above, it is also possible only to carry out the treatment with the complexing agent or only the treatment with the tetrachloride, or to carry out both simultaneously. It is also possible to replace the titanium tetrachloride by a chemical equivalent such as the tetrachlorides of vanadium, silicon or carbon. However, the results obtained in accordance with these variants are less advantageous than those obtained with the method described in the above-mentioned Belgian Patent. In fact, these variants generally do not give particles having as regular a morphology or as high an internal porosity as the preferred method of working. As a result, the catalytic activity of these particles is less high and the morphology of the polymer obtained is less good. Furthermore, these variants give trichlorides which contain relatively large amounts of aluminum chlorides. As a result, the particles give less stereospecific catalysts.

The particles of titanium trichlorides subjected to drying do not consist exclusively of the compound of the chemical formula $TiCl_3$. In general, this compound is associated, in the form of a solid solution, in a cocrystallised form or in a complexed form, with other compounds, which in general originate from the preparation of the trichloride. In general, these other compounds cannot be removed by washing by means of the hydrocarbons which are preferably associated with the particles subjected to drying. In the majority of cases, the particles contain at least 50% by weight of $TiCl_3$ relative to the total dry weight. Preferably, they contain at least 65% of $TiCl_3$. The most favourable results are obtained when they contain at least 80% of $TiCl_3$.

Certain methods of preparation of the particles of titanium trichlorides lead to perfectly dry particles. These particles can nevertheless be dried in accordance with the invention after having been impregnated beforehand with a suitable liquid and, preferably, with the hydrocarbons described above.

The particles according to the invention in general do not differ, from the point of view of their structure, from the particles used for their preparation. Thus, if they are prepared starting from spherical particles consisting of an agglomerate of extremely porous spherical micro-particles, they have substantially the same structure, the same dimensions and the same shapes as the starting particles. As a result, they are also characterized by the same large specific surface area associated with the same high pore volume. Everything which has been stated with regard to these starting particles applies to the particles according to the invention, to which the starting particles lead.

Equally, the particles of titanium trichlorides according to the invention contain at least 50% by weight of $TiCl_3$ relative to the total dry weight. Preferably, they contain at least 65% of $TiCl_3$. The most favourable results are obtained when they contain at least 80% of $TiCl_3$.

After having been dried, and preferably after their temperature has again fallen below 30° C., the particles according to the invention can immediately be brought back into contact with a liquid and especially with a hydrocarbon such as those which are preferably associated with them before drying, and which can also be used as diluents in the suspension polymerization. The particles according to the invention can also be subjected to a pre-activation treatment and, where appropriate, a pre-polymerization treatment, as described in Belgian Pat. No. 803,875 filed on Aug. 22, 1973 by Solvay & Cie., and can be stored under hexane for long periods without losing their properties.

For the polymerization, the particles of titanium trichloride according to the invention are used conjointly with an activator chosen from amongst the organo-metallic compounds of metals of groups Ia, IIa, IIb and IIIb of the periodic table and preferably from amongst the compounds of the formula $AlR'_m X_{3-m}$ where R' is a hydrocarbon radical, containing from 1 to 18 carbon atoms and preferably from 1 to 12 carbon atoms, chosen from amongst alkyl, aryl, aralkyl, alkylaryl and cycloalkyl radicals, the best results being obtained if R' is chosen from amongst the alkyl radicals containing from 2 to 6 carbon atoms, X is a halogen chosen from amongst fluorine, chlorine, bromine and iodine, the best results being obtained if X is chlorine, and m is any number such that $0 < m \leq 3$ and preferably such that $1.5 \leq m \leq 2.5$; the best results are obtained if m is equal to 2.

The diethyl-aluminum chloride ($AlEt_2Cl$) ensures maximum activity and stereospecificity of the catalyst system.

The catalyst systems thus defined are applicable to the polymerization of olefines with terminal unsaturation, the molecule of which contains from 2 to 18, and preferably from 2 to 6, carbon atoms, such as ethylene, propylene, 1-butene, 1-pentene, methylbutene, 1-hexene, 3- and 4-methyl-1-pentenes and vinylcyclohexane. They are of particular value for the stereospecific polymerisation of propylene, 1-butene and 4-methyl-1-pentene to give crystalline, highly isotactic polymers. They are also applicable to the copolymerization of these alpha-olefines with one another as well as with diolefines containing from 4 to 18 carbon atoms. Preferably, the diolefines are non-conjugated aliphatic diolefines such as 1,4-hexadiene, non-conjugated monocyclic diolefines such as 4-vinylcyclohexene, alicyclic diolefines having an endocyclic bridge such as dicyclopentadiene, methylenenorbornene and ethylenenorbornene, and conjugated aliphatic diolefines such as butadiene or isoprene.

They are also applicable to the manufacture of so-called block copolymers which are built up from alpha-olefines and diolefines. These block copolymers consist of successions of segments of varying chain lengths; each segment consists of a homopolymer of an alpha-olefine or of a statistical copolymer comprising an alpha-olefine and at least one comonomer chosen from amongst the alpha-olefines and the diolefines. The alpha-olefines and the diolefines are chosen from amongst those mentioned above.

The particles according to the invention are particularly suitable for the manufacture of homopolymers of propylene and of copolymers containing a total of at least 50% by weight of propylene and preferably 75% by weight of propylene.

The polymerization can be carried out in accordance with any known process, namely in solution or in suspension in a hydrocarbon solvent or a hydrocarbon diluent, which is preferably chosen from amongst the aliphatic or cycloaliphatic hydrocarbons such as butane, pentane, hexane, heptane, cyclohexane, methylcyclohexane or their mixtures. The polymerisation can also be carried out in the monomer or in one of the monomers, which is kept in the liquid state or in the gas phase.

The polymerization temperature is generally chosen between 20° and 200° C. and preferably, if the process is carried out in suspension, between 50° and 80° C., the best results being obtained between 65° and 75° C. The pressure is generally chosen between atmospheric pressure and 50 atmospheres and preferably between 10 and 30 atmospheres. This pressure is of course a function of the temperature used.

The polymerization can be carried out continuously or discontinuously.

The preparation of the so-called block copolymers can also be carried out in accordance with known processes. It is preferred to use a two-stage process which consists of polymerizing an alpha-olefine, generally propylene, in accordance with the method described above for the homopolymerization. Thereafter, the other alpha-olefine and/or diolefine, generally ethylene, is polymerized in the presence of the homopolymer chain, which is still active. This second polymerization can be carried out after having completely or partially removed the monomer which has not reacted during the first stage.

The organo-metallic compound and the particles can be added separately to the polymerization medium. It is also possible to bring them into contact, at a temperature of between −40° and 80° C., for a period which can range up to 2 hours, before introducing them into the polymerisation reactor.

The total amount of organo-metallic compound employed is not critical; it is generally greater than 0.1 mmol per liter of diluent, of liquid monomer or of reactor volume, and preferably greater than 1 mmol per liter.

The amount of particles employed is decided in accordance with their $TiCl_3$ content. It is generally so chosen that the concentration in the polymerization medium is greater than 0.01 mmol of $TiCl_3$ per liter of diluent, of liquid monomer or of reactor volume, and preferably greater than 0.2 mmol per liter.

The ratio of the amounts of organo-metallic compound and of particles is also not critical. It is generally so chosen that the molar ratio of organo-metallic compound to $TiCl_3$ present in the particles is between 0.5 and 20 and preferably between 1 and 15. The best results are obtained when the molar ratio is between 2 and 10.

The molecular weight of the polymers manufactured according to the process of the invention can be regulated by adding, to the polymerization medium, one or more molecular weight regulators such as hydrogen, diethyl-zinc, alcohols, ethers and alkyl halides.

It is also possible to add to the polymerization medium a complexing agent of the same type as the agents which can be used in the preparation of the particles in accordance with the method described in Belgian Pat. No. 780,758.

The stereospecificity and the activity of the particles according to the invention are at least as high, and frequently higher, than those of the catalyst complexes described in Belgian Pat. No. 780,758, if the particles are prepared from the latter. Thus, in the homopolymerization of propylene, the proportion of amorphous polypropylene, evaluated by measuring the weight of polypropylene soluble in the inert solvent used for the polymerization and for washing, relative to the total polypropylene produced during the polymerization, is almost always less than 3%. As regards the activity, expressed in g of insoluble polypropylene per hour and per g of $TiCl_3$ contained in the particles, it easily reaches 2,500 g of insoluble polypropylene if the homopolymerization is carried out at about 70° C., in hexane suspension.

Finally, the particles according to the invention make it possible, surprisingly, to obtain polymers of apparent specific gravity slightly higher, all other conditions being equal, than that of the polymers obtained using catalyst complexes which have not been dried according to the invention. These very high apparent specific gravities are advantageous from the point of view of reducing the dimensions of the polymerization installations and storage areas which they demand. Furthermore, the very narrow particle size distribution of the polymer powders and the very high mean diameter of the particles, combined with this high apparent specific gravity, substantially facilitate the polymer drying operations and the subsequent use of the polymer by the customary moulding methods.

The examples which follow serve to illustrate the invention without limiting its scope.

EXAMPLE 1

A. Preparation of the Starting Particles 120 ml of dry hexane and 30 ml of pure $TiCl_4$ are introduced, under a nitrogen atmosphere, into a 500 ml reactor equipped with a blade stirrer revolving at 140 rpm. This hexane-$TiCl_4$ solution is cooled to 1 ($\pm$1)° C. In the course of 4.5 hours, a solution consisting of 90 ml of hexane and 34.2 ml of $AlEt_2Cl$ is added thereto, whilst maintaining the temperature of 1 ($\pm$1)° C. in the reactor.

After adding the $AlEt_2Cl$-hexane solution, the reaction mixture consisting of a suspension of fine particles is stirred at 1 ($\pm$1)° C. for 15 minutes and is then heated to 23° C. in the course of 1 hours, kept at this temperature for 1 hour, and then heated to 65° C. in the course of about 1 hour. The mixture is then stirred for 2 hours at 65° C.

The liquid phase is then separated from the solid by filtration and the solid product, referred to as "reduced solid", is washed 5 times with 100 ml of dry hexane, the solid being re-suspended for each wash.

The "reduced solid" is suspended in 300 ml of diluent (hexane) and 48.5 ml of diisoamyl ether (DIAE) are added thereto. The suspension is stirred for 1 hour at 35° C. Thereafter the solid obtained, referred to as "treated solid", is separated from the liquid phase.

47 g of the "treated solid" are suspended in 95 ml of hexane and 25 ml of TiCl$_4$ contained in a 500 ml glass three-neck reactor equipped with a double jacket for water circulation, a sintered disc, a side-tube for filtration and a two-blade stirrer, and the suspension is stirred at 70° C. for 2 hours. The liquid phase is then removed by filtration and the solid obtained is washed 4 times with 100 ml of hexane at 70° C.

B. Drying

The drying of the washed solid is carried out on the cake obtained from the last wash with hexane and containing about 200 ml of hexane/kg, using a stream of nitrogen fed to the bottom of the reactor at a rate of 300 l/hour and distributed through the sintered disc at a temperature of about 25° C. The temperature of the double jacket is about 70° C. After 10 minutes, fluidization of the particles is observed.

The drying of the particles is then continued for 4 hours at 70° C., with the same nitrogen flow rate. At the end of the treatment, a solid containing 861 g of TiCl$_3$, 6.9 g of aluminum, 106 g of DIAE and 1.9 g of hexane per kg is obtained.

C. Polymerization of Propylene by Means of the Dried Particles 1 liter of dry and purified hexane is introduced into a 5 liter stainless steel autoclave which has been flushed several times with nitrogen. Thereafter, 240 mg of AlEt$_2$Cl (in the form of a solution, containing 200 g/l, in hexane) and 58 mg of dried particles, representing about 50 mg of TiCl$_3$, are introduced in succession. The AlEt$_2$Cl/TiCl$_3$ molar ratio is thus about 6.2.

The autoclave is heated to 70° C. and is brought back to atmospheric pressure by slow letting-down. Thereafter, an absolute hydrogen pressure of 0.20 kg/cm$^2$ is set up; propylene is then introduced into the autoclave until a total pressure, at the temperature in question, of 12.7 kg/cm$^2$ is reached. This pressure in kept constant during the polymerization by introducing gaseous propylene.

After 3 hours, the polymerization is stopped by venting the propylene.

The contents of the autoclave are poured onto a Büchner filter, rinsed three times with 0.5 l of hexane and dried under reduced pressure at 50° C. 296 g of hexane-insoluble polypropylene (PP) are obtained.

12.4 g of soluble polymer, corresponding to 4.2%, are found in the hexane from the polymerization and from the wash.

The catalytic activity is thus 1,978 g of polypropylene/hour×g TiCl$_3$ and the productivity is 5,103 g of polypropylene/g of particles.

The apparent specific gravity (ASG) of the insoluble polypropylene fraction is 0.424 kg/dm$^3$. This polypropylene is in the form of regular and smooth particles of very narrow particle size distribution.

EXAMPLE 2

Dried particles are prepared in the same manner as in Example 1, with the same flow rate of nitrogen, but using a treatment of 3 hours at 90° C.

The solid obtained contains 841 g of TiCl$_3$, 2.7 g of aluminum, 43 g of DIAE and about 0.1 g of hexane per kg.

A propylene polymerization experiment carried out under the same conditions as in Example 1 but with 105 mg of particles dried at 90° C. makes it possible to obtain 405 g of hexane-insoluble polypropylene.

5.3 g of soluble polymer, representing 1.3%, are found in the hexane from the polymerisation and from the wash.

The catalytic activity is thus 1,531 g of polypropylene/hour×g TiCl$_3$ and the productivity is 3,850 g of polypropylene/g of particles.

The ASG of the insoluble polypropylene fraction is 0.443 kg/dm$^3$.

EXAMPLE 3

Experiment (a)

Particles prepared as in Example 1 (A) are dried under a vacuun of 2 mm Hg for 90 minutes at 25° C.

The solid obtained contains 815 g of TiCl$_3$, 108 g of DIAE, 6.7 g of aluminum and about 7.9 g of hexane per kg.

A propylene polymerization experiment is carried out under the general conditions described in Example 1 (C), the particular conditions being as follows:

amount of dried particles used: 73 mg (that is to say about 59 mg of TiCl$_3$)

molar ratio AlEt$_2$Cl/TiCl$_3$: 5.2.

368 g of hexane-insoluble PP are obtained.

28.3 g of soluble polymer, representing 7.7%, are found in the hexane from the polymerization and the wash.

The catalytic activity is thus 2,065 g of PP/hour×g TiCl$_3$ and the productivity is 5,048 g of PP/g of particles.

The ASG of the insoluble polypropylene fraction is 0.322 kg/dm$^3$.

The reduction in ASG which occurs when the liquid content of the dried particles is relatively higher can thus be seen.

Experiment (b)

A supplementary drying of the particles under a higher vacuum (0.1 mm Hg) for 2 hours at 25° C. gives particles of which the hexane content is only 0.3 g/kg.

A fresh polymerization experiment carried out with the latter (molar ratio AlEt$_2$Cl/TiCl$_3$: 5.5) under the conditions of Example 1 (C) makes it possible to obtain 360 g of hexane-insoluble PP (only 4.8% of soluble polymer).

The catalytic activity is 2,131 g of PP/hour×g TiCl$_3$ and the productivity is 5,210 g of PP/g of particles.

The ASG of the insoluble polypropylene fraction is 0.404 kg/dm$^3$, that is to say markedly higher than that of the polypropylene obtained in the presence of the particles of Experiment (a).

Example 4R

This example is given by way of comparison.

Particles according to Example 1 (A) are prepared. However, the drying indicated in Example 1 (B) is not carried out and instead the cake resulting from the last wash with hexane is merely suction-drained until the pourability of the solid is adequate and the hexane content of the solid has been brought to 40 g/kg.

The ASG of the hexane-insoluble polypropylene fraction obtained after a polymerization experiment carried out as indicated in Example 1 (C) is only 0.287 kg/dm$^3$. The morphology of the particles of this polymer is very mediocre, the particles being fissured to their core.

We claim:
1. Particles of titanium trichlorides which can be used for the stereospecific polymerization of alpha-olefines, which have been dried until their liquid content is less than 1% by weight relative to the weight of titanium trichloride present in the particles, the particles being of spherical shape and consisting of an agglomerate of micro-particles which are themselves spherical and which are porous.

2. Particles according to claim 1, which have been dried until their liquid content is less than 0.5%.

3. Particles according to claim 1, which have been dried until their liquid content is less than 0.3%.

4. Particles according to any one of claims 1 to 3, which have been obtained from particles of titanium trichlorides associated with a liquid selected from the group consisting of aliphatic, cycloaliphatic and aromatic hydrocarbons and their mixtures.

5. Particles according to claim 4, wherein the liquid is selected from the group consisting of aliphatic and cycloaliphatic hydrocarbons containing from 3 to 12 carbon atoms and their mixtures.

6. Particles according to claim 5, wherein the liquid is technical-grade hexane.

7. Particles according to claim 1, 2, or 3, which have been dried at a temperature below 90° C.

8. Particles according to claim 1, 2, or 3, which have been dried for a period of between 15 minutes and 48 hours.

9. Particles according to claim 1, 2, or 3, wherein their diameter is between 5 and 100 microns and in that the diameter of the micro-particles is between 0.05 and 1 micron.

10. Particles according to claim 9, wherein their apparent specific gravity is between 0.06 and 1.2 kg/dm$^3$.

11. Particles according to claim 1, wherein their specific surface area is greater than 75 m$^2$/g and up to 250 m$^2$/g and their internal pore volume is greater than 0.15 cm$^3$/g and up to 0.35 cm$^3$/g.

12. Particles according to claim 1, wherein their diameter is between 15 and 50 microns, the diameter of the micro-particles is between 0.1 and 0.3 micron, their specific surface area is between 100 and 250 m$^2$/g and their internal pore volume is between 0.15 and 0.35 cm$^3$/g.

13. Particles according to claim 1, wherein their chemical composition corresponds to the formula

$$TiCl_3 \cdot (AlRCl_2)_x \cdot C_y$$

where R is an alkyl radical containing from 2 to 6 carbon atoms, C is a complexing agent which is an aliphatic ether having aliphatic radicals comprised of from 4 to 6 carbon atoms, x is a number less than 0.20 and y is any number greater than 0.009.

14. Particles according to claim 13 wherein y is less that 0.20.

15. Particles of titanium trichlorides which can be used for the stereospecific polymerisation of alpha-olefins which have been dried until their liquid content is less than 1% by weight relative to the weight of titanium trichloride present in the particles, the particles being of spherical shape and consisting of an agglomerate of micro-particles which are themselves spherical and which are porous, the particles having a specific surface area which is greater than 0.15 cm$^3$/g and up to 0.35 cm$^3$/g, the particles having a chemical composition which corresponds to the formula

$$TiCl_3 \cdot (AlRCl_2)_x \cdot C_y$$

where R is an alkyl radical containing from 2 to 6 carbon atoms, C is a complexing agent which is an aliphatic ether having aliphatic radicals comprised of from 4 to 6 carbon atoms, x is any number less than 0.20 and y is any number greater than 0.009.

16. Process for the preparation of particles of titanium trichlorides which can be used for the sterospecific polymerization of alpha-olefins comprising: drying particles of titanium trichlorides until their liquid content is less than 1% by weight relative to the weight of titanium trichloride present in the particles, the particles being of spherical shape and consisting of an agglomerate of micro-particles which are themselves spherical and which are porous.

17. Process according to claim 16, wherein the particles are dried until their liquid content is less than 0.5%.

18. Process according to claim 16, wherein the particles are dried until their liquid content is less than 0.3%.

19. Process according to any one of claims 16 to 18, wherein particles associated with a liquid selected from the group consisting of aliphatic, cycloaliphatic and aromatic hydrocarbons and their mixtures are dried.

20. Process according to claim 19, wherein the liquid is selected from the group consisting of aliphatic and cycloaliphatic hydrocarbons containing from 3 to 12 carbon atoms and their mixtures.

21. Process according to claim 20, wherein the liquid is technical-grade hexane.

22. Process according to claim 16, 17, or 18, wherein the particles are dried at a temperature below 90° C.

23. Process according to claim 16, 17, or 18, wherein the drying is continued for a period of between 15 minutes and 48 hours.

24. Process according to claim 16, 17, or 18, wherein particles of titanium trichlorides obtained by reduction of titanium tetrachloride by means of an organo-aluminum compound are dried.

25. Process according to claim 24, wherein the organo-aluminum compound is a dialkyl-aluminum chloride of which the alkyl chains contain from 1 to 6 carbon atoms.

26. Process according to claim 25, wherein the particles obtained by reduction of titanium tetrachloride have subsequently been treated by means of a complexing agent.

27. Process according to claim 26, wherein the complexing agent is an aliphatic ether of which the aliphatic radicals contain from 4 to 6 carbon atoms.

28. Process according to claim 27, wherein the particles treated by the complexing agent have subsequently been treated with titanium tetrachloride.

29. Process for the preparation of particles of titanium trichlorides which can be used for the stereospecific polymerisation of alpha-olefins, comprising drying particles of titanium trichlorides until their liquid content is less than 1% by weight relative to the weight of titanium trichloride present in the particles, the particles being of spherical shape and consisting of an agglomerate of micro-particles which are themselves spherical and which are porous, the particles having a specific surface area which is greater than 75 m$^2$/g. and up to 250 m$^2$/g and an internal pore volume which is greater than 0.15 cm$^3$/g and up to 0.35 cm$^3$/g, the particles having a chemical composition which corresponds to the formula $$TiCl_3 \cdot (AlRCl_2)_x \cdot C_y$$

where R is an alkyl radical containing from 2 to 6 carbon atoms, C is a complexing agent which is an aliphatic ether having aliphatic radicals comprised of from 4 to 6 carbon atoms, x is any number less than 0.20 and y is any number greater than 0.009.

30. Process for the polymerization of alpha-olefine in the presence of a catalyst system comprising an organometallic compound of a metal from at least one of groups Ia, IIa, IIb, and IIIb of the periodic table and particles of titanium trichlorides, comprising: employing particles of titanium trichlorides which have been dried until their liquid content is less than 1% by weight relative to the weight of titanium trichloride present in the particles, said particles being of spherical shape and consisting of an agglomerate of micro-particles which are themselves spherical and which are porous.

31. Process according to claim 30, wherein particles of titanium trichlorides which have been dried until their liquid content is less than 0.5% are used.

32. Process according to claim 30, wherein particles of titanium trichlorides which have been dried until their liquid content is less than 0.3% are used.

33. Process according to any one of claims 30 to 32, wherein particles obtained from particles of titanium trichlorides associated with a liquid selected from the group consisting of aliphatic, cycloaliphatic and aromatic hydrocarbons and their mixtures are used.

34. Process according to claim 33, wherein the liquid is selected from the group consisting of aliphatic and cycloaliphatic hydrocarbons containing from 3 to 12 carbon atoms and their mixtures.

35. Process according to claim 34, wherein the liquid is technical-grade hexane.

36. Process according to claim 30, 31, or 32, wherein particles which have been dried at a temperature below 90° C. are used.

37. Process according to claim 30, 31, or 32, wherein characterised in that particles which have been dried for a period of between 15 minutes and 48 hours are used.

38. Process according to claim 30, wherein the diameter of the particles is between 5 and 100 microns and in that the diameter of the micro-particles is between 0.05 and 1 micron.

39. Process according to claim 30, wherein the apparent specific gravity of the particles is between 0.6 and 1.2 kg/dm$^3$.

40. Process according to claim 30, wherein the specific surface area of the particles is greater than 75 m$^2$/g and up to 250 m$^2$/g and their internal pore volume is greater than 0.15 cm$^3$/g and up to 0.35 cm$^3$/g.

41. Process according to claim 30, wherein the diameter of the particles is between 15 and 50 microns, the diameter of the micro-particles is between 0.1 and 0.3 micron, the specific surface area of the particles is between 100 and 250 m$^2$/g and the internal pore volume of the particles is between 0.15 and 0.35 cm$^3$/g.

42. Process according to claim 30, wherein the chemical composition of the particles corresponds to the formula $$TiCl_3 \cdot (AlRCl_2)_x \cdot C_y$$

where R is an alkyl radical containing from 2 to 6 carbon atoms, C is a complexing agent which is an aliphatic ether having aliphatic radicals comprised of from 4 to 6 carbon atoms, x is any number less than 0.20 and y is any number greater than 0.009.

43. Process according to claim 42 wherein y is less than 0.20.

44. Process for the polymerisation of alpha-olefins in the presence of a catalyst system including an organometallic compound of a metal from at least one of the groups Ia, IIa, IIb, and IIIb of the periodic table and particles of titanium trichlorides, comprising: employing particles of titanium trichlorides which have been dried until their liquid content is less than 1% by weight relative to the weight of titanium trichloride present in the particles, said particles being of spherical shape and consisting of an agglomerate of micro-particles, which are themselves spherical and which are porous, the particles having a specific surface area which is greater than 75 m$^2$/g and up to 250 m$^2$/g and an internal pore volume which is greater than 0.15 cm$^3$/g and up to 0.35 cm$^3$/g, the particles having a chemical composition corresponding to the formula $$TiCl_3 \cdot (AlRCl_2)_x \cdot C_y$$

where R is an alkyl radical containing from 2 to 6 carbon atoms, C is a complexing agent which is an aliphatic ether having aliphatic radicals comprises of from 4 to 6 carbon atoms, x is any number less than 0.20 and y is any number greater than 0.009.

* * * * *